United States Patent [19]

Chen

[11] Patent Number: 5,582,272
[45] Date of Patent: Dec. 10, 1996

[54] BICYCLE BRAKE MECHANISM

[76] Inventor: Zen-Ming Chen, P.O. Box 63-99, Taichung, Taiwan

[21] Appl. No.: 625,711

[22] Filed: Apr. 3, 1996

[51] Int. Cl.$^6$ .................................................. B62L 3/00
[52] U.S. Cl. ................................. 188/24.21; 188/24.22; 74/502.6
[58] Field of Search ........................ 188/24.11–24.16, 188/24.21, 24.22; 74/500.5, 502.6

[56] References Cited

U.S. PATENT DOCUMENTS 4,026,390  5/1977  Yoshigai ........................... 188/24.21
5,464,074  11/1995  Yoshikawa ......................... 188/24.22
5,531,296  7/1996  Liu ................................... 188/24.21
5,538,107  7/1996  Lumpkin ........................... 188/24.21

*Primary Examiner*—Robert J. Oberleitner
*Assistant Examiner*—Chris Schwartz

[57] ABSTRACT

A bicycle brake mechanism includes a holder having a pair of panels. A bridging member connects the lower portions of the panels together so as to form a channel for supporting a brake cable. A bolt is engaged through the upper portions of the panels and has an aperture formed in the middle portion for engaging with another brake cable. The channel is formed between the panels so as to allow the two brake cables to be aligned with each other and so as to better facilitate the operation of the brake mechanism.

2 Claims, 2 Drawing Sheets

BICYCLE BRAKE MECHANISM

BACKGROUND OF THE INVENTION

1. Field of the Invention

The present invention relates to a brake mechanism, and more particularly to a bicycle brake mechanism.

2. Description of the Prior Art

A typical bicycle brake mechanism is shown in FIGS. 4 and 5 and comprises a plate 10 having a hook provided in the bottom portion thereof for engaging with a brake cable 17 which has two ends coupled to the brake levers 16. The plate 10 includes a bolt engaged through the upper portion thereof for engaging with a nut 15 so as to secure a brake cable 13 to the plate 10. Two washers 14 are normally engaged on the bolt 12 and engaged with the plate 10 and the brake cable 13. However, as shown in FIG. 5, a small distance D is formed between the brake cable 13 and the plate such that the plate 10 will be tilted during a braking operation. In addition, the bolt 12 and the nut 15 are apt to be separated from each other by the tilting movement of the plate 10 relative to the bolt Furthermore, the brake cables 13 and 17 are not aligned such that the brake levers 16 may not be effectively pulled and actuated by the brake cable The present invention has arisen to mitigate and/or obviate the afore-described disadvantages of the conventional bicycle brake mechanisms.

SUMMARY OF THE INVENTION

The primary objective of the present invention is to provide a bicycle brake mechanism which includes a mechanism that may be effectively operated.

In accordance with one aspect of the invention, there is provided a bicycle brake mechanism comprising a holder including a pair of panels having a lower portion connected together by a bridging member so as to define a channel therein for supporting a first brake cable, the panels each including an upper portion having an orifice formed therein, a bolt engaged through the orifices of the panels and including a first end having a head formed therein for engaging with the holder and including a second end having an outer thread formed therein, the bolt including a middle portion having an aperture formed therein for engaging with a second brake cable and for allowing the second brake cable to be engaged between the ears of the panels, and a nut including an inner thread formed therein for engaging with the outer thread of the bolt so as to secure the second cable to the holder. The channel is formed between the panels so as to allow the first brake cable to be aligned with the first brake cable. The panels each includes an opening formed therein for reducing weight.

Further objectives and advantages of the present invention will become apparent from a careful reading of a detailed description provided hereinbelow, with appropriate reference to accompanying drawings.

DETAILED DESCRIPTION OF THE PREFERRED EMBODIMENT

Figure 2:
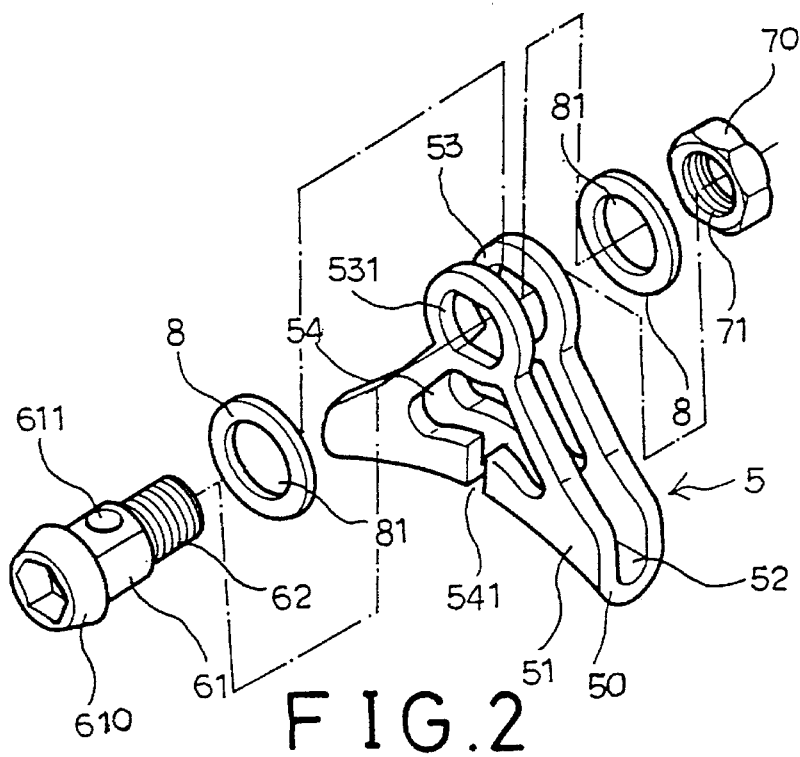
FIG. 2 is an exploded view of the brake mechanism.
Figure 1:
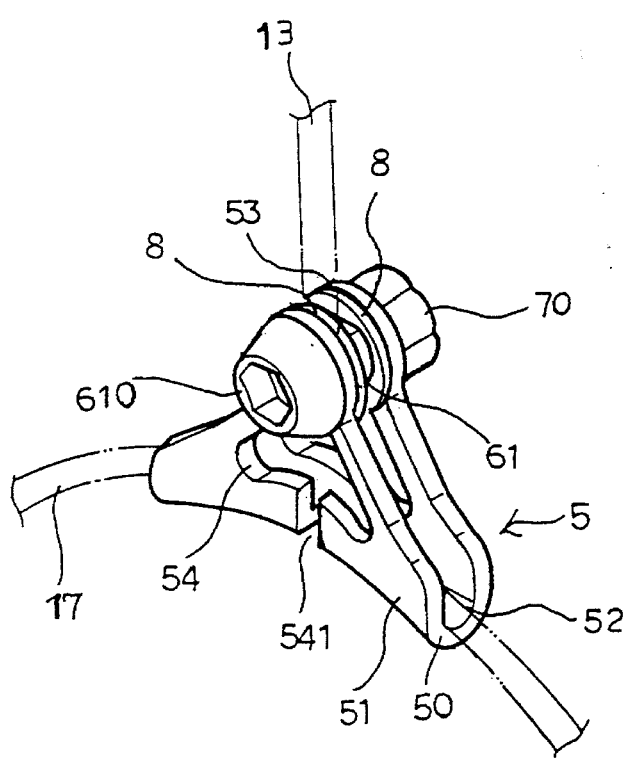
FIG. 1 is a perspective view of a bicycle brake mechanism in accordance with the present invention.
Figure 3:
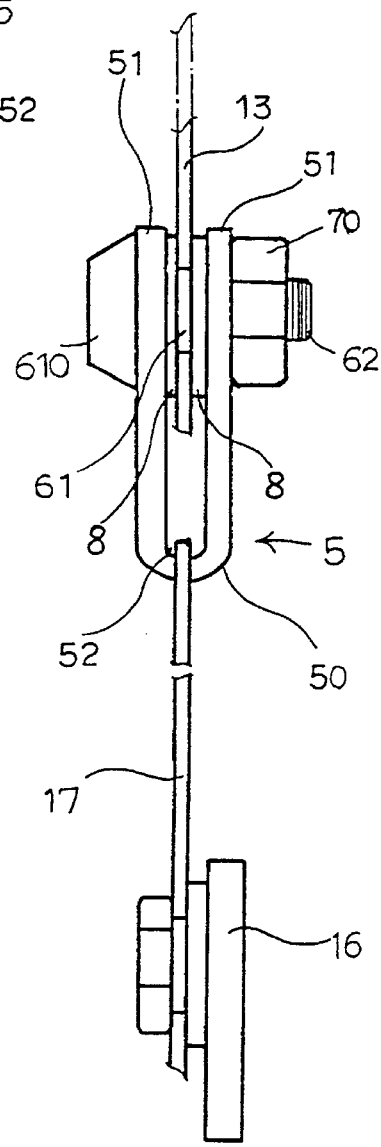
FIG. 3 is a side view of the brake mechanism.
Figure 5:
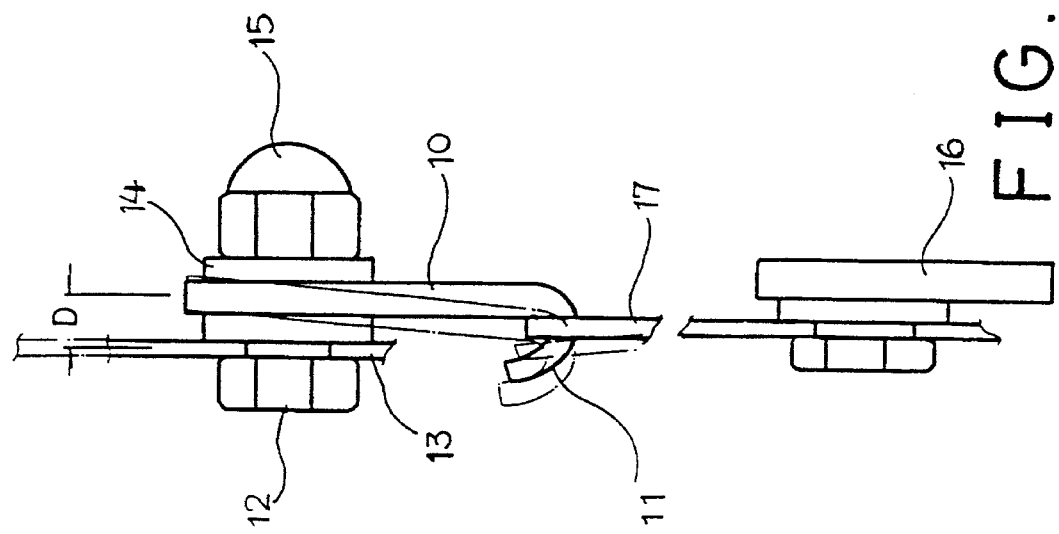
FIG. 5 is a side view of the typical bicycle brake mechanism.
Figure 4:
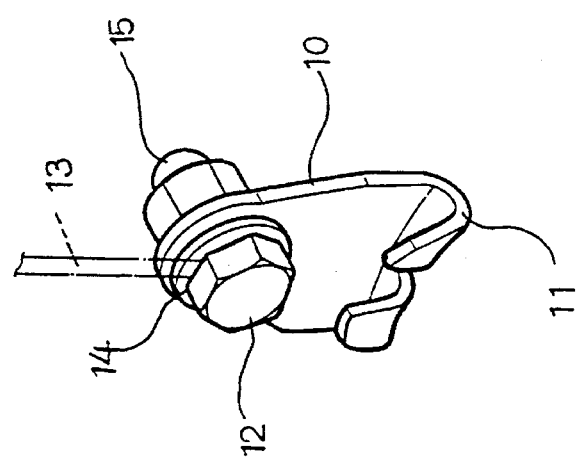
FIG. 4 is a perspective view of a typical bicycle brake mechanism.

Referring to FIGS. 1 to 3, a bicycle brake mechanism in accordance with the present invention comprises a holder 5 including a pair of panels 51 having a lower portion connected together by a bridging member 50 so as to define a channel 52 therein for engaging with and for supporting a brake cable 17 which has two ends coupled to the brake levers 16. The panels 5J each includes an ear 53 provided on the upper portion thereof and having an orifice 531 formed therein for engaging with a bolt 61. Two washers 8 each includes a hole 81 formed therein for engaging with the bolt 61. The bolt 61 includes a head 610 for engaging with the holder 5 and includes an outer thread 62 formed in the other end opposite to the head 610 for engaging with the inner thread 71 of a nut 70. The bolt 61 further includes an aperture 611 formed therein for engaging with a brake cable 13 which can be solidly secured to the holder 5 by the bolt 61 and the nut 70. The panels 51 may each include an opening 54 formed therein for reducing weight of the brake mechanism. One of the panels 51 may further include a notch 541 formed therein for engaging with the brake cable 13.

As best shown in FIG. 3, the brake cable 13 is engaged between the ears 53 of the panels 51 such that the brake cables 13 and 17 can be aligned with each other and can be aligned with the center portion of the holder 5 such that the brake levers 16 may be effectively pulled and actuated by the holder 5 and the brake cables 13, 17.

Accordingly, the bicycle brake mechanism in accordance with the present invention includes two brake cables aligned with the cable holder such that the brake levers can be effectively operated.

Although this invention has been described with a certain degree of particularity, it is to be understood that the present disclosure has been made by way of example only and that numerous changes in the detailed construction and the combination and arrangement of parts may be resorted to without departing from the spirit and scope of the invention as hereinafter claimed.

I claim:

1. A bicycle brake mechanism comprising:

a holder including a pair of panels having a lower portion connected together by a bridging member so as to define a channel therein for supporting a first brake cable, said panels each including an upper portion having an orifice formed therein, a bolt engaged through said orifices of said panels and including a first end having a head formed therein for engaging with said holder and including a second end having an outer thread formed therein, said bolt including a middle portion having an aperture formed therein for engaging with a second brake cable and for allowing the second brake cable to be engaged between said ears of said panels, and a nut including an inner thread formed therein for engaging with said:outer thread of said bolt so as to secure said second cable to said holder, wherein said channel is formed between said panels so as to allow the first brake cable to be aligned with the second brake cable.

2. A bicycle brake mechanism according to claim 1, wherein said panels each includes an opening formed therein for reducing weight.

\* \* \* \* \*